(12) United States Patent
Shan et al.

(10) Patent No.: US 9,032,827 B2
(45) Date of Patent: May 19, 2015

(54) LOCATING BEAM AND ROBOT LINEAR MOTION UNIT HAVING THE SAME

(75) Inventors: Zhongde Shan, Beijing (CN); Feng Liu, Beijing (CN); Shaokai Chen, Beijing (CM); Limin Liu, Beijing (CN)

(73) Assignee: Advanced Manufacture Technology Center, China Academy Of Machinery Science & Technology, Beijing (CN)

( * ) Notice: Subject to any disclaimer, the term of this patent is extended or adjusted under 35 U.S.C. 154(b) by 0 days.

(21) Appl. No.: 13/878,969

(22) PCT Filed: May 18, 2011

(86) PCT No.: PCT/CN2011/074278
§ 371 (c)(1),
(2), (4) Date: Apr. 11, 2013

(87) PCT Pub. No.: WO2012/155349
PCT Pub. Date: Nov. 22, 2012

(65) Prior Publication Data
US 2014/0053668 A1  Feb. 27, 2014

(30) Foreign Application Priority Data

May 16, 2011 (CN) .......................... 2011 1 0126387

(51) Int. Cl.
*F16H 19/06* (2006.01)
*B25J 9/02* (2006.01)
(Continued)

(52) U.S. Cl.
CPC ............ *B25J 9/023* (2013.01); *Y10T 74/18848* (2015.01); *Y10T 74/18792* (2015.01);
(Continued)

(58) Field of Classification Search
CPC .... B65G 1/0435; B65G 1/0407; B63C 15/00; A24B 1/08; B66F 9/07; H01L 21/67775; H01L 21/67769; H01L 21/67772; F16H 19/06; F16H 2019/0686; Y10T 74/18848
USPC ................. 74/89, 89.14, 89.2, 89.22, 490.01; 414/266, 277, 940; 384/59, 57, 56, 55, 384/11, 15, 17, 21, 26, 43, 45; 474/62, 63, 474/39, 80; 49/324, 332, 347; 108/137–143

See application file for complete search history.

(56) References Cited

U.S. PATENT DOCUMENTS 3,884,363 A * 5/1975 Ajlouny ...................... 414/626
4,588,346 A * 5/1986 Smith ........................... 414/673
(Continued)

FOREIGN PATENT DOCUMENTS

CN         1047749 C    12/1999
CN       201046573 Y     4/2008
(Continued)

OTHER PUBLICATIONS

International Search Report (Form PCT/ISA/210) for PCT/CN2011/074278, mailed Mar. 1, 2012.

*Primary Examiner* — William C Joyce
*Assistant Examiner* — Jude Agendia
(74) *Attorney, Agent, or Firm* — Koppel, Patrick, Heybl & Philpott (57) ABSTRACT

A locating beam and a robot linear motion unit having the same, wherein the locating beam comprises a first support beam and a second support beam which are parallel to each other, a crossbeam connected between the first support beam and the second support beam and is vertical to the beams, and a joints between the crossbeam and the beams is provided with a right-angle connecting piece. The robot linear motion unit includes a motion track and a transmission mechanism arranged along the extension direction of the motion track, and the motion track is arranged on a surface of the locating beam. Arranging the crossbeam and right-angle connecting pieces between the first support beam and the second support beam in the locating beam, improves the mechanical structure strength, reduces deflection deformation and twist deformation of the locating beam, and improves the impact resistance of the robot linear motion unit.

7 Claims, 7 Drawing Sheets

(51) Int. Cl.
  *B25J 5/02* (2006.01)
  *B25J 5/04* (2006.01)
  *B25J 9/08* (2006.01)
  *B25J 19/00* (2006.01)

(52) U.S. Cl.
  CPC .............. *Y10T74/18568* (2015.01); *B25J 5/02* (2013.01); *B25J 5/04* (2013.01); *B25J 9/08* (2013.01); *B25J 19/0075* (2013.01); *Y10S 901/25* (2013.01); *Y10S 901/49* (2013.01)

(56) References Cited

U.S. PATENT DOCUMENTS

| | | | |
|---|---|---|---|
| 4,597,707 A * | 7/1986 | Cornacchia | 414/792 |
| 4,890,420 A * | 1/1990 | Azimi | 451/273 |
| 5,252,024 A * | 10/1993 | Breda et al. | 414/806 |
| 5,438,647 A * | 8/1995 | Nagamatsu et al. | 700/247 |
| 7,181,988 B2 * | 2/2007 | Nagai et al. | 74/89.22 |
| 7,666,065 B2 * | 2/2010 | Langenbach | 451/11 |
| 8,042,653 B2 * | 10/2011 | Grebinoski et al. | 182/223 |
| 8,491,250 B2 * | 7/2013 | Zhang et al. | 414/673 |
| 2005/0061092 A1* | 3/2005 | Meier | 74/89.22 |
| 2010/0210383 A1* | 8/2010 | Jones | 474/62 |

FOREIGN PATENT DOCUMENTS

| | | |
|---|---|---|
| DE | 19921729 A1 | 11/2000 |
| NL | 1013343 C2 | 4/2001 |
| WO | WO0238473 A1 | 5/2002 |

* cited by examiner

LOCATING BEAM AND ROBOT LINEAR MOTION UNIT HAVING THE SAME

This application claims the priority of Chinese patent application with application No. 201110126387.1, titled as "Locating Beam and Robot Linear Motion Unit Having the same", and filed on May 16, 2011, and all disclosed contents thereof should be incorporated herein by reference.

FIELD OF THE INVENTION

The present invention relates to the field of robot linear motion system, and in particular to a locating beam and a robot linear motion unit having the same.

BACKGROUND OF THE INVENTION

In the current industrial automation age of rapid development, more and more processes need to be completed by higher-degree automation equipments. Moreover, with the continuous increase of labour cost, and a demand for better working environment, robotic products come into being. Cartesian-coordinate robot, as the name implies, is industrial automation robot equipment which takes the stereoscopic space formed by a spatial geometrical relationship along XYZ directions as the work space. In industrial applications, this equipment can be set according to different procedures, to realize automatic control and form a multi-purpose manipulator.

The Cartesian-coordinate robot mainly consists of four function modules, a linear motion unit, a driving unit, a control unit and an end operation unit. In order to reduce the cost of the Cartesian-coordinate robot, to shorten product R&D cycle, to improve the product reliability and performance, many countries in Europe and America have modularized the Cartesian-coordinate robot, and the linear motion unit is the most typical and most important unit in the modularization. The function of the linear motion unit is adding all motion elements to a whole movement unit, which is comprised of a motion support part (light bar or linear guide rail), a locating body profile part (various types of profiles), a transmission part (synchronous pulley, synchronous belt or lead screw) and a slide block motion part (which moves as the pulling of a synchronous belt or a leads crew nut).

With the continuous development of technology, people have proposed higher requirements such as high speed, high precision, high reliability, easy operability and maintainability on the performances of the Cartesian-coordinate robot. As the core unit of the Cartesian-coordinate robot, the performance of the linear motion unit, such as reliability, stability, operability and maintainability, receives more and more attentions of scientific and technical personnel; and the improvement of the performance of the linear motion unit mainly depends on the locating body profile part and the motion support part. The conventional locating body profile part is an assembly space cut out on the middle section of a common aluminium profile, for assembling a transmission unit, and the motion support part is directly laid in the assembly space. In this way, the mechanical structure of the original profile would be destroyed and the mechanical performance of the entire structure would be degraded too. Moreover, the conventional locating body profile part and the motion support part form a cantilever structure by adopting a single aluminium profile or form a frame structure by adopting double aluminium profiles; however, long-period actual experiences show that the two mechanical structures abased on aluminium profile are easy to suffer different degrees of deflection deformation and twist deformation, and the impact resistance is relatively low when the robot is moving with a relatively high speed. These defects are very fatal for a Cartesian-coordinate robot linear motion system which is required of high performances, high reliability and high precision.

Therefore, it is necessary to provide a linear motion unit which has a stable mechanical structure and a high impact resistance, and can reduce deflection deformation and twist deformation.

SUMMARY OF THE INVENTION

The purpose of the present invention is to provide a locating beam and a robot linear motion unit having the same, which can solve the technical problem that the impact resistance of the linear motion unit is low for the locating body profile of the existing linear motion unit being easy to suffer deflection deformation and twist deformation.

In order to achieve the purpose above, according to one aspect of the present invention, a locating beam comprises: a first support beam and a second support beam which are parallel to each other, wherein a crossbeam is connected between the first support beam and the second support beam and is vertical to the first support beam and the second support beam, and each of the joints between the crossbeam and the first support beam and between the crossbeam and the second support beams is provided with a right-angle connecting piece.

Further, both sides of each of the said joints between the crossbeam and the first support beam and between the crossbeam and the second support beams are provided with the right-angle connecting pieces.

Further, each end of the first support beam and the second support beam is provided with an integrated or separated sealing cover plate.

Further, the first support beam, the second support beam and the crossbeam are all aluminium profile.

According to another aspect of the present invention, a robot linear motion unit is provided, which comprises a motion track and a transmission mechanism arranged along the extension direction of the motion track, wherein the motion track is arranged on a surface of the locating beam described above.

Further, the transmission mechanism comprises a single-track transmission mechanism; the motion track is a single track arranged on the first support beam and the second support beam of the locating beam.

Further, the transmission mechanism comprises a double-track transmission mechanism; the motion track is a first track and a second track arranged respectively on the first support beam and the second support beam of the locating beam.

Further, the transmission mechanism is a lead screw transmission mechanism.

Further, the transmission mechanism is a synchronous pulley transmission mechanism.

Further, the surface of the locating beam installed with the motion track is provided with a dust shield for covering the motion track.

The present invention has the following advantages.

By arranging the crossbeam and the right-angle connecting piece between the first support beam and the second support beam, the present invention can effectively improve the mechanical structure strength of the locating beam, reduce the deflection deformation and twist deformation of the locating beam, and improve the impact resistance of the robot linear motion unit.

Besides purposes, features and advantages described above, the present invention also has other purposes, features and advantages. Other purposes, features and advantages of the present invention will be further described in details below as shown in drawings.

BRIEF DESCRIPTION OF THE DRAWINGS

Drawings, which form a part of the description and are provided for further understanding of the present invention, show the preferred embodiments of the present invention, and explain the principle of the present invention together with the description. In the drawings.

DETAILED DESCRIPTION OF THE EMBODIMENTS

The embodiments of the present invention will be described in detail below as shown in the drawings; however the present invention may be implemented by various different ways defined and covered by the claims. In the drawings, identical components are indicated by identical reference number.

Figure 1:
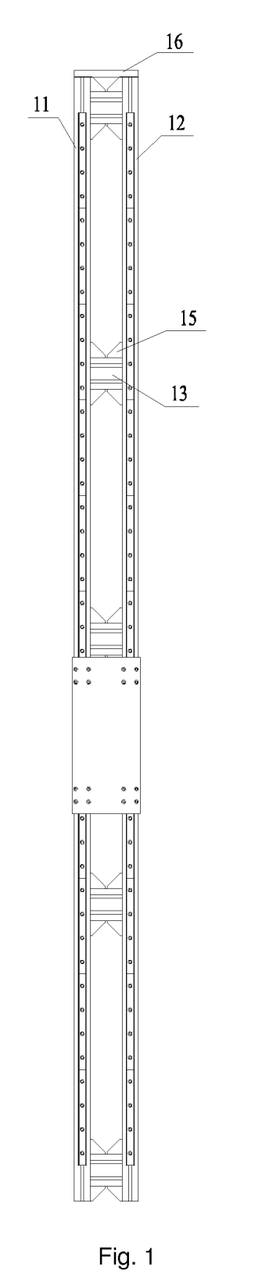
FIG. 1 is a front structure schematic view of a locating beam which is applicable to a single-track transmission mechanism according to a preferred embodiment of the present invention.
Figure 2:
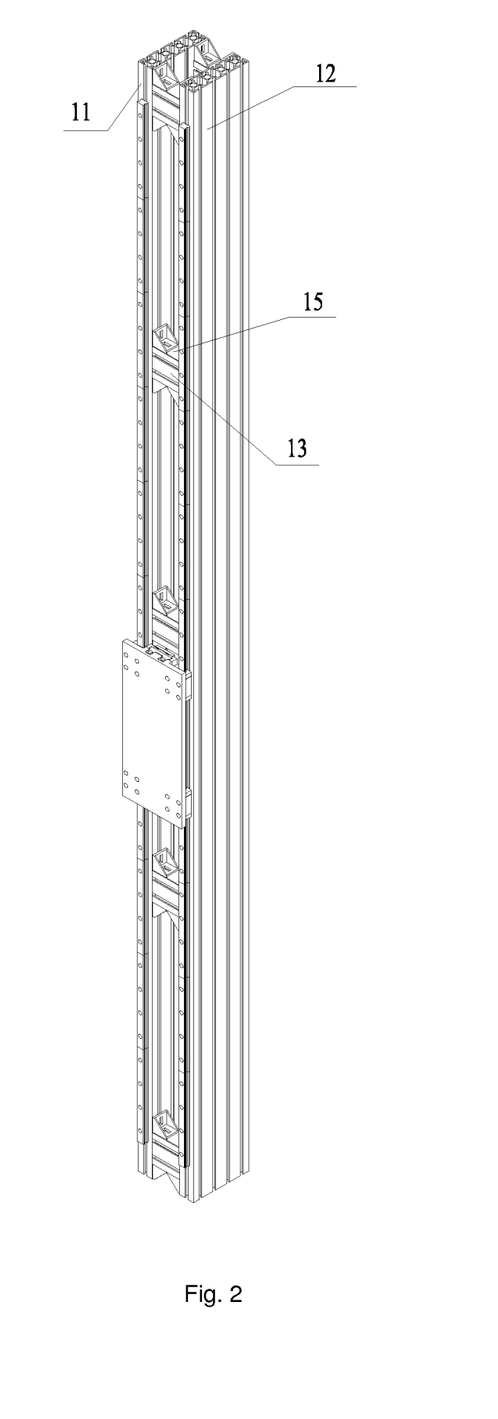
FIG. 2 is a stereo structure schematic view of a locating beam which is applicable to a single-track transmission mechanism according to a preferred embodiment of the present invention.

As shown in FIG. 1 and FIG. 2, according to one aspect of the present invention, a locating beam comprises: a first support beam 11 and a second support beam 12 which are parallel to each other, wherein a crossbeams 13 is connected between the first support beam 11 and the second support beam 12 and is vertical to the first support beam 11 and the second support beam 12, and each of the joints between the crossbeam 13 and the first support beam 11 and between the crossbeam 13 and the second support beams 12 are provided with a right-angle connecting piece 15.

By adopting two parallel support beams and by arranging the crossbeam and the right-angle connecting piece between the two support beams, the present invention can effectively improve the torsion resistance of the locating beam, reduce the twist deformation of the locating beam and improve the impact resistance of the entire linear motion unit.

Preferably, in order to improve the structure strength of the first support beam 11 and the second support beam 12 and to improve the connection strength between the crossbeam and the first support beam 11 and the second support beams 12, both two sides of the joint between each crossbeam 13 and the first support beam 11 and the second support beams 12 are provided with the right-angle connecting pieces 15. That is to say, four right-angle connecting pieces 15 can be arranged on the upper and lower sides of one crossbeam totally.

According to the application scene of the linear motion unit, the length of the locating beam probably can be different. The number of the crossbeam 13 can be increased as the length of the locating beam increases.

In order to prevent the sections of the two ends of the locating beam from hurting working staff and to make the locating beam more beautiful, the ends of the first support beam 11 and the second support beam 12 are provided with an integrated sealing cover plate 16 or separated sealing cover plates 16. When the first support beam 11 and the second support beam 12 have a relatively smaller thickness and a relatively shorter distance therebetween, a sealing cover plate 16 can be adopted to seal the two support beams. When the two support beams have a relatively bigger thickness and a relatively longer distance therebetween, two sealing cover plates 16 can be adopted to seal the ends of the first support beam 11 and the second support beam 12 respectively.

In order to improve the overall performance of the locating beam, the first support beam 11, the second support beam 12 and the crossbeam 13 all are aluminium profile.

According to another aspect of the present invention, a robot linear motion unit is further provided, which comprises a motion track and a transmission mechanism arranged along the extension direction of the motion track, wherein the motion track is arranged on a surface of the locating beam described above.

Arranging the motion track on the surface of the locating beam avoids opening mounting groove on the locating beam, so the section of the locating beam profile isn't destroyed and the mechanical performance of the locating beam is well guaranteed. The transmission mechanism can be a single-track transmission mechanism (refer to FIG. 1 and FIG. 2). In this embodiment, the first support beam 11 and the second support beam 12 are relatively thinner, the distance therebetween is relatively shorter, the length of the crossbeam is relatively shorter, and the distance between the four right-angle connecting pieces 15 is relatively shorter too. The motion track is a single track 21 arranged on the first support beam 11 and the second support beam 12 of the locating beam.

Figure 3:
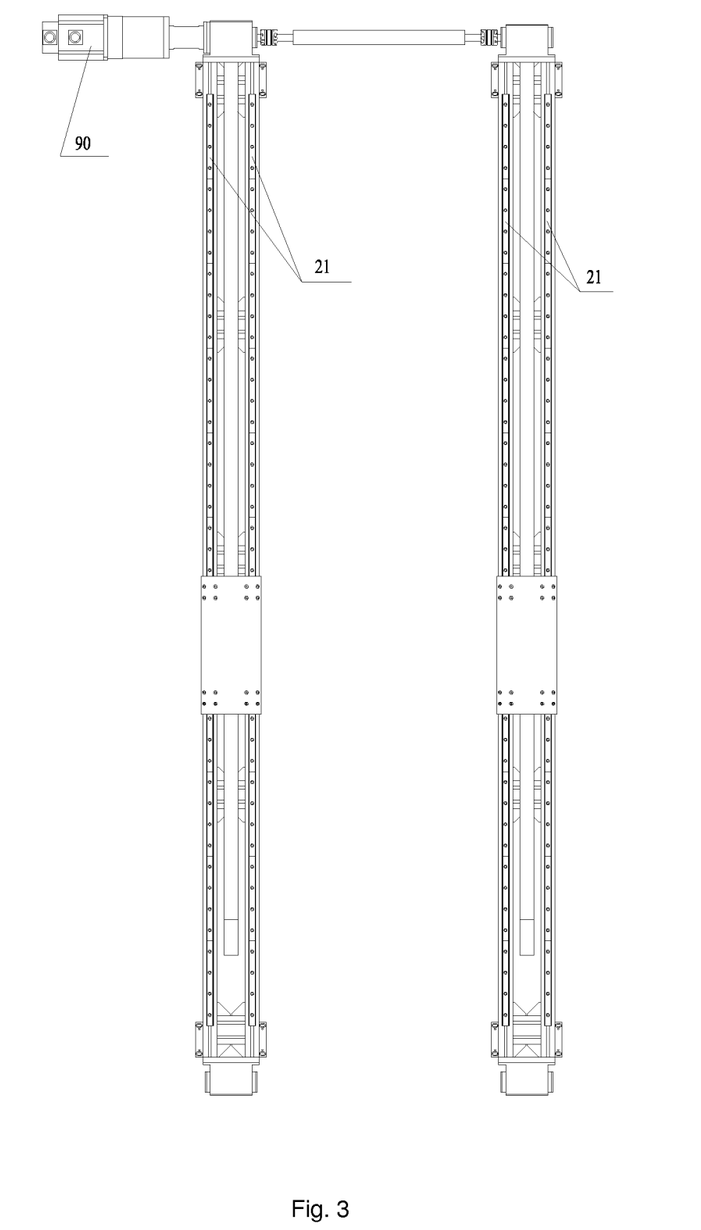
FIG. 3 is a front structure schematic view of two locating beams which are applicable to a single-track transmission mechanism and on which two transmission mechanisms adopt one driving motor to drive according to a preferred embodiment of the present invention.
Figure 4:
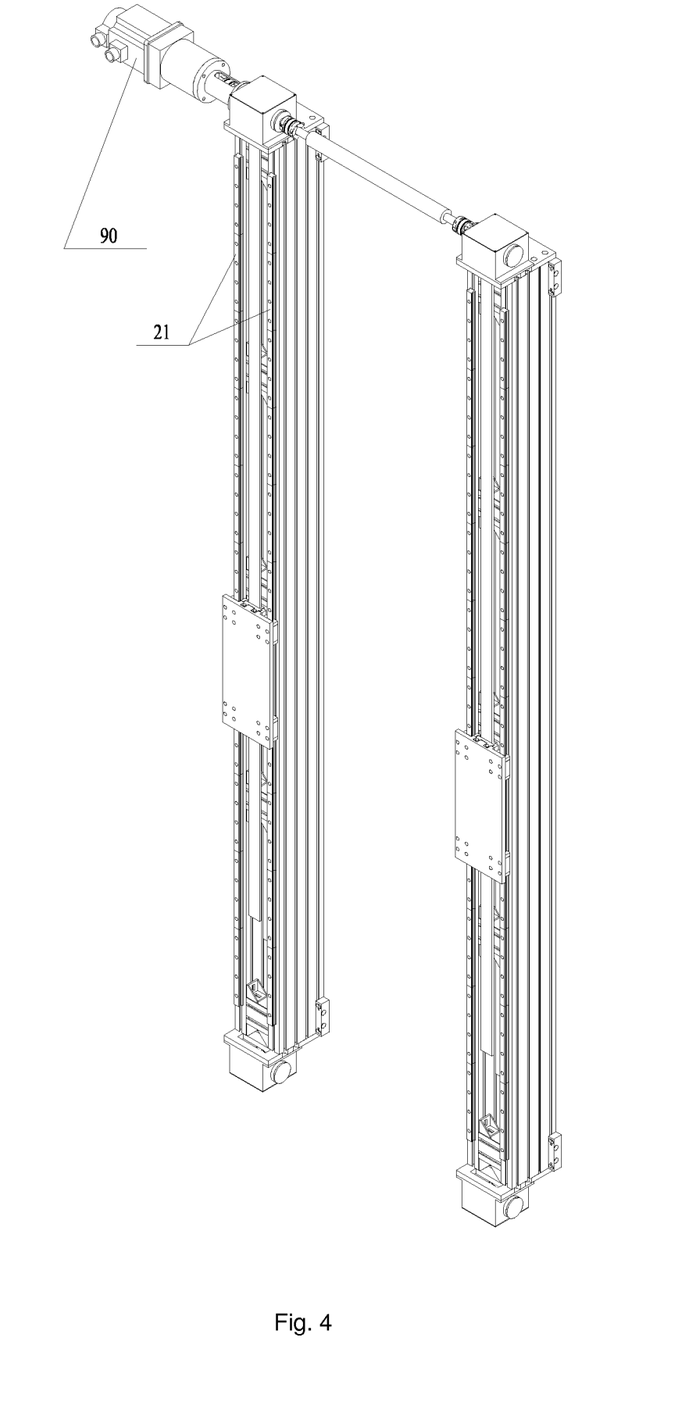
FIG. 4 is a stereo structure schematic view of two locating beams which are applicable to a single-track transmission mechanism and on which two transmission mechanisms adopt one driving motor to drive according to a preferred embodiment of the present invention.

As shown in FIG. 3 and FIG. 4, a driving motor 90 can be adopted to drive two single-track transmission mechanisms, and each of the single-track transmission mechanisms can be arranged on one locating beam respectively.

Figure 5:
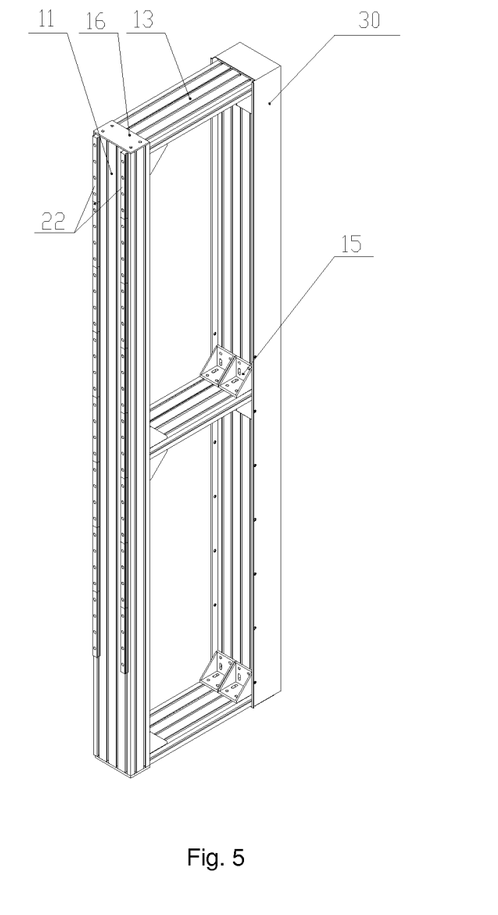
FIG. 5 is a stereo structure schematic view of a locating beam which is applicable to a double-track transmission mechanism according to a preferred embodiment of the present invention.

As shown in FIG. 5, the transmission mechanism can be a double-track transmission mechanism, wherein the double tracks can be applied to the motion unit with greater impact force. In this embodiment, the thickness of the first support beam 11 and the second support beam 12 is relatively bigger and the distance therebetween is relatively longer. The locating beam is similar to a frame structure. And the motion track is a first track 22 and a second track, which is not shown in figures and is arranged symmetrically to the first track 22, respectively arranged on the first support beam 11 and the second support beam 12. The double-track transmission mechanism has two sliders which slide on the first track 22 and the second track respectively. It should be noted that each track, including the single track 21, the first track 22 and the second track, comprises two parallel monorails; that is to say, when the transmission mechanism is a double-track transmission mechanism, four monorails are arranged on the locating beam totally (each of the first support beam 11 and the second support beam 12 is provided with two monorails).

Preferably, the transmission mechanism is a lead screw transmission mechanism or a synchronous pulley transmission mechanism.

In order to protect the motion track from dust, the surface of the locating beam installed with the motion track is provided with a dust shield 30 covering the motion track. Actually, it also can be understood that the motion track is arranged on the axially extending side of the locating beam.

Hereinafter, the linear motion units adopting the double-track lead screw transmission mechanism and the double-track synchronous pulley transmission mechanism are described respectively.

Figure 6:
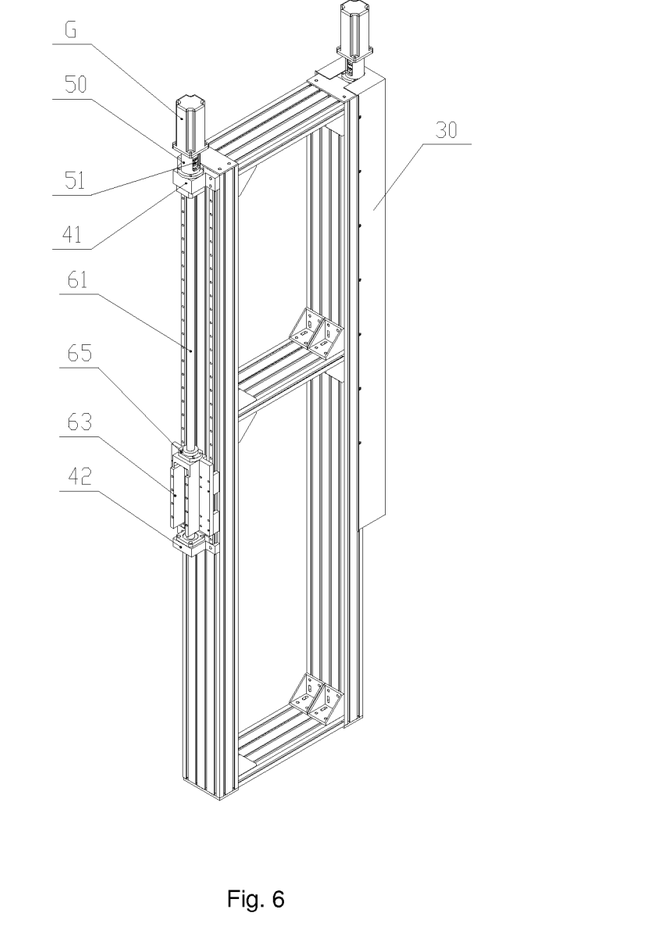
FIG. 6 is a stereo structure schematic view of a locating beam which is applicable to a double-track transmission mechanism installed with a lead screw transmission mechanism according to a preferred embodiment of the present invention.

As shown in FIG. 6, the structures of the locating beam (locating body profile) and the transmission mechanism (motion support unit) in the robot linear motion unit provided by the present invention are as follows: two ends of the first support beam 11 and the second support beam 12 are provided with the sealing cover plate 16; the crossbeam 13 is fixed between the two support beams through standard right-angle fasteners 15. In the condition that the two ends of the two support beams are provided with the crossbeam 13 respectively, in order to enforce the system structure strength, to improve the system reliability and to improve the system precision, the number of crossbeams 13 between the support beams can be determined according to the length of the support beam. The motion track can be fixed on each side of the first support beam 11 and the second support beam 12 through bolts, and the dust shield 30 can be fixed on the two support beams through bolts respectively.

Figure 7:
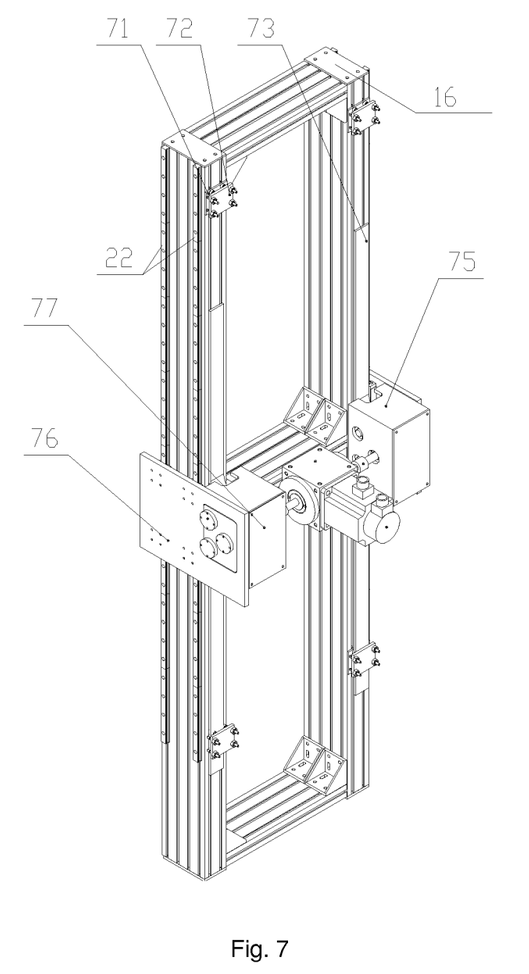
FIG. 7 is a stereo structure schematic view of a locating beam which is applicable to a double-track transmission mechanism installed with a synchronous pulley transmission mechanism according to a preferred embodiment of the present invention.

As shown in FIG. 7, the structure of the adopted lead screw transmission mechanism is as follows: a first bearing seat 41 and a second bearing seat 42 are fixed on two ends of each support beam through bolts respectively; a servo motor G is fixed on a speed reducer 50 through bolts; and the speed reducer 50 is fixed on the first bearing seat 41 through bolts; one end of the lead screw 61 is fixed on the first bearing seat 41 through a first bearing and is directly connected with the shaft of the servo motor G through a coupler 51; while the other end of the lead screw 61 is fixed on the second bearing seat 42 through a second bearing; a slider 63 passes through the lead screw 61 and is fixed on the motion track; a lead screw nut 65 passes through the lead screw 61 and is fixed on the slider 63. Under the driving of the servo motor G, the slider 63 can perform reciprocal rectilinear motion along the motion track. Thus, the guide function of motion is realized.

The structure of the adopted synchronous pulley transmission mechanism is as follows: a synchronous belt clip 71 is fixed on the first support beam 11 and the second support beam 12 through four bolts; a synchronous belt platen 72 is fixed on the synchronous belt clip 71 through four bolts; two ends of a synchronous belt 73 are fixed on a support beam through one synchronous belt platen 72 and one synchronous belt clip 71 respectively; the synchronous belt 73 passes through a belt wheel box 75, and the belt pulley box 75 is fixed with a synchronous belt slider 76 through bolts; a box cover plate 77 is fixed on the belt pulley box 75 through four bolts. The synchronous belt slider 76 is fixed on the motion track and can perform reciprocating rectilinear motion with the belt pulley box 75 under the driving of the servo motor 40. Thus, the guide function of motion is realized.

Compared with the prior art, the Cartesian-coordinate robot linear motion system in the present invention has advantages such as high overall mechanical strength, high structure reliability, strong impact resistance, strong twist resistance, easy maintenance and convenient operation. The innovation of the present invention lies in that the first support beam 11 and the second support beam 12 that are parallel to each other and the crossbeam 13 forming the combination structure (that is, locating body profile part) in the Cartesian-coordinate robot linear motion system all adopt aluminium profile, and that the transmission unit (synchronous pulley transmission mechanism or lead screw transmission mechanism) is fixed on the surface of the locating beam. Another innovation lies in that the crossbeam 13 in the Cartesian-coordinate robot linear motion system can be fixed between the first support beam 11 and the second support beam 12 through standard right-angle connecting pieces 15 simply and conveniently. In the condition that two ends of the first support beam 11 and the second support beam 12 are provided with the crossbeam 13 respectively, in order to enforce the system structure strength, to improve the system reliability and to improve the system precision, the number of crossbeams 13 between the support beams can be determined according to the length of the support beam. To sum up, the Cartesian-coordinate robot linear motion system has a light overall weight; the section of the transmission locating beam is not destroyed and the mechanical performance is well guaranteed.

Above contents only describe the preferred embodiments of the present invention and are not intended to limit the present invention; for one skilled in the art, the present invention may have various modifications and changes. Any modifications, equivalent replacements and improvements made within the spirit and principle of the present invention should be included within the protection scope of the present invention.

The invention claimed is:

1. A robot linear motion unit, comprising a motion track (21, 22) and a transmission mechanism arranged along the extension direction of the motion track (21, 22), wherein the motion track (21, 22) is arranged on a surface of a locating beam;
    the locating beam comprises a first support beam (11) and a second support beam (12) which are parallel to each other, wherein a crossbeam (13) is connected between the first support beam (11) and the second support beam (12) and is vertical to the first support beam (11) and the second support beam (12), and a joint between the crossbeam (13) and the first support beam (11) and a joint between the crossbeam (13) and the second support beam (12) are provided with a right-angle connecting piece (15) respectively;
    the transmission mechanism is a synchronous pulley transmission mechanism which comprises a synchronous belt clip fixed on the first support beam or the second support beam and a synchronous belt platen fixed on the synchronous belt clip, wherein two ends of a synchronous belt are fixed on the first support beam or the second support beam through the synchronous belt platen and the synchronous belt clip respectively, and the synchronous belt passes through a belt wheel box, and the belt wheel box is fixed with a synchronous belt slider; the synchronous belt slider is fixed on the motion track and can perform reciprocating rectilinear motion with the belt wheel box under the driving of a servo motor.

2. The robot linear motion unit according to claim 1, wherein the transmission mechanism comprises a single-track transmission mechanism; the motion track (21, 22) comprises a single-track (21) arranged on the first support beam (11) and the second support beam (12) of the locating beam.

3. The robot linear motion unit according to claim 2, wherein the surface of the locating beam installed with the motion track (21, 22) is provided with a dust shield (30) covering the motion track (21, 22).

4. The robot linear motion unit according to claim 1, wherein the transmission mechanism comprises a double-track transmission mechanism; the motion track (21, 22) comprises a first track (22) and a second track arranged respectively on the first support beam (11) and the second support beam (12) of the locating beam.

5. The robot linear motion unit according to claim 4, wherein the surface of the locating beam installed with the motion track (21, 22) is provided with a dust shield (30) covering the motion track (21, 22).

6. The robot linear motion unit according to claim 1, wherein the surface of the locating beam installed with the motion track (21, 22) is provided with a dust shield (30) covering the motion track (21, 22).

7. A robot linear motion unit, comprising a motion track (21, 22) and a transmission mechanism arranged along the extension direction of the motion track (21, 22), wherein the motion track (21, 22) is arranged on a surface of a locating beam;

the locating beam comprises a first support beam (11) and a second support beam (12) which are parallel to each other, wherein a crossbeam (13) is connected between the first support beam (11) and the second support beam (12) and is vertical to the first support beam (11) and the second support beam (12), and both sides of a joint between the crossbeam (13) and the first support beam (11) and both sides of a joint between the crossbeam (13) and the second support beam (12) are provided with a right-angle connecting piece (15) respectively;

the transmission mechanism is a synchronous pulley transmission mechanism which comprises a synchronous belt clip fixed on the first support beam or the second support beam and a synchronous belt platen fixed on the synchronous belt clip, wherein two ends of a synchronous belt are fixed on the first support beam or the second support beam through the synchronous belt platen and the synchronous belt clip respectively, and the synchronous belt passes through a belt wheel box, and the belt wheel box is fixed with a synchronous belt slider; the synchronous belt slider is fixed on the motion track and can perform reciprocating rectilinear motion with the belt wheel box under the driving of a servo motor.

\* \* \* \* \*